US00RE41819E

(19) United States
(12) Reissued Patent
Miya et al.

(10) Patent Number: US RE41,819 E
(45) Date of Reissued Patent: *Oct. 12, 2010

(54) TRANSMISSION APPARATUS AND BASE STATION APPARATUS USING THE SAME

(75) Inventors: Kazuyuki Miya, Tokyo (JP); Masaki Hayashi, Osaka (JP); Takashi Kitade, Kanagawa (JP)

(73) Assignee: Panasonic Corporation, Osaka (JP)

( * ) Notice: This patent is subject to a terminal disclaimer.

(21) Appl. No.: 11/798,176

(22) Filed: May 10, 2007

Related U.S. Patent Documents

Reissue of:
(64) Patent No.: 6,891,817
Issued: May 10, 2005
Appl. No.: 10/308,140
Filed: Dec. 3, 2002

U.S. Applications:
(63) Continuation of application No. 09/321,857, filed on May 28, 1999, now Pat. No. 6,519,238.

(30) Foreign Application Priority Data

Jun. 5, 1998 (JP) ..... 10-157405
Feb. 26, 1999 (JP) ..... 11-51059

(51) Int. Cl.
*H04B 7/216* (2006.01)
*H04J 4/00* (2006.01)
H04L 7/00; H04B 15/00; H04B 7/00; H04B 17/00

(52) U.S. Cl. ..... 370/335; 370/342; 370/441; 370/479; 375/356; 455/502; 455/67.11; 455/63.1

(58) Field of Classification Search ..... 370/320, 370/335, 342, 441, 479; 375/356, 358; 455/502, 455/67.11, 63.1
See application file for complete search history.

(56) References Cited

U.S. PATENT DOCUMENTS 5,103,459 A 4/1992 Gilhousen et al.

(Continued)

FOREIGN PATENT DOCUMENTS

EP 0795971 9/2007

(Continued)

OTHER PUBLICATIONS

Kenichi Higuchi et al., "Fast Cell Search Algorithm Using Long Code Masking in DS–CDMA Asynchronous Cellular System" Kenichi Higuchi et al., Technical Report of IEICE, DSP 96–116, SAT96–111, RCS 96–122, Jan. 1997, with an English language Abstract.

(Continued)

*Primary Examiner*—Un C Cho
(74) *Attorney, Agent, or Firm*—Dickinson Wright PLLC

(57) ABSTRACT

The transmission apparatus according to the present invention includes a switching device that switches the multiplexing destination of mask symbols and uses this switching device to switch the multiplexing destination of the mask symbols so that the mask symbols multiplexed with control channel signals transmitted in parallel from a plurality of antennas may be transmitted from only one antenna at each transmission timing.

12 Claims, 8 Drawing Sheets

U.S. PATENT DOCUMENTS

| | | | | |
|---|---|---|---|---|
| 5,614,914 | A | 3/1997 | Bolgiano | |
| 5,652,764 | A | 7/1997 | Kanzaki et al. | |
| 5,710,768 | A | 1/1998 | Ziv et al. | |
| 5,812,593 | A | 9/1998 | Kaku | |
| 6,018,667 | A | 1/2000 | Ghosh et al. | |
| 6,069,884 | A | 5/2000 | Hayashi et al. | |
| 6,128,332 | A | 10/2000 | Fukawa et al. | |
| 6,167,037 | A | 12/2000 | Higuchi et al. | |
| 6,185,244 | B1 | 2/2001 | Nystrom et al. | |
| 6,226,315 | B1 | 5/2001 | Sriram et al. | |
| 6,259,683 | B1 | 7/2001 | Sekine et al. | |
| 6,510,173 | B1 | 1/2003 | Garmonov et al. | |
| 6,519,238 | B1 * | 2/2003 | Miya et al. | 370/335 |

FOREIGN PATENT DOCUMENTS

| | | |
|---|---|---|
| JP | 05041685 | 2/1993 |
| JP | 09135199 | 5/1997 |
| JP | 09307951 | 11/1997 |
| JP | 10094041 | 4/1998 |
| JP | 10126377 | 5/1998 |
| JP | 10126379 | 5/1998 |
| JP | 10126380 | 5/1998 |
| JP | 10200447 | 7/1998 |
| JP | 10257019 | 9/1998 |
| JP | 10271557 | 10/1998 |
| JP | 10327126 | 12/1998 |
| JP | 10336074 | 12/1998 |
| WO | 9707646 | 2/1997 |

OTHER PUBLICATIONS

Johan Nystrom et al., "One Cell Search Methods for WCDMA Cellular System", Technical Report of IEICE, DSP 97–148, SAT97–105, RCS 97–193, Jan. 1998, with an English language Abstract.

European Search Report dated Apr. 11, 2002 (99110595.8).

European Search Report dated Apr. 11, 2002 (01108416.7).

K. Higuchi, et al.; "Fast Cell Search Algorithm in DS–CDMA Mobile Radio Using Long Spreading Codes", Vehicular Technology Conference 1997, IEEE 47th Phoenix, AZ, USA May 4–7, 1997, New York, NY, USA, IEEE, pp. 1430–1434, XP010229096, ISBN: 0–7803–3659–3.

K. Miya, et al.; "Wideband CDMA Systems in TDD–Mode Operation for IMT–2000", IEICE Transactions on Communication, Institute of Electronics Information and Comm. Eng. Tokyo, JP, vol. E81–B, No. 7, Jul. 1, 1998, pp. 1317–1325, XP000790163, ISBN: 0916–8516.

Austrian Search Report dated Apr. 26, 2001.

J. H. Winters—"The Diversity Gain of Transmit Diversity in Wireless Systems with Rayleigh Fading"—May 1, 1994, pp. 1121–1125.

Japanes Office Action dated May 25, 2004 with English translation.

Higuchi et al., "Fast Cell Search Algorithm Using Long Code Masking in DS–CDMA Asynchronous Cellular System", Technical Report of IEICE, DSP 96–116, SAT96–111, RCS 96–122, Jan. 1997, with English Abstract.

Nystrom, et al., "One Cell Search Methods for WCDMA Cellular System", Technical Report of IEICE, DSP 97–148, SAT97–105, RCS 97–193 Jan. 1998, with English Abstract.

English Translation of Japanese Office Action dated Jun. 5, 2001.

English Translation of Japanese Office Action dated Sep. 4, 2001.

* cited by examiner

TRANSMISSION APPARATUS AND BASE STATION APPARATUS USING THE SAME

Matter enclosed in heavy brackets [ ] appears in the original patent but forms no part of this reissue specification; matter printed in italics indicates the additions made by reissue.

This is a continuation of application Ser. No. 09/321,857, filed May 28, 1999 now U.S. Pat. No. 6,519,238.

BACKGROUND OF THE INVENTION

1. Field of the Invention

The present invention relates to transmission apparatuses used in radio communication systems and base station apparatuses using them.

2. Description of the Related Art

CDMA (Code Division Multiple Access) has been developed as a multiple access system used in next generation mobile communication systems. In this CDMA cellular system, it is necessary to make a cell search for establishing initial synchronization when a mobile station turns on power or for cell switching (handover) when traveling.

Regarding the cell search method in this CDMA cellular system, as described in "Fast Cell Search Algorithm using Long Code Masking in DS-CDMA Asynchronous Cellular Systems" by Higuchi, Sawabashi, Adachi, et al., in TECHNICAL REPORT OF IEICE (RCS96-122, 1997-01), a method is proposed by which long codes of downlink control channels are masked and correlation detection is performed on these masked parts using short codes which are common to cells to detect the timing and type of the long codes.

According to this system, the transmitting side (base station) code-multiplexes symbols spread using a short code (CSC) which is common to cells and symbols spread using a long code group identification short code (GIC), with the long code masked part and transmits them, and the receiving side (mobile station) detects the timings by the short code which is common to cells, then limits long code candidates to be searched for by a long code identification section using the long code group identification short codes and specifies the cell-specific long codes from among these long code candidates, achieving a fast cell search. The above two short codes(CSC and GIC) are codes for search, called search codes hereinafter.

Furthermore, the transmitting side is provided with a plurality of transmission antennas per sector, and if control channel signals are spread using different short codes and each transmitted in parallel from a plurality of antennas, the control channel signals become more resistant to fading variations (especially during slow movement) and shadowing due to a transmission diversity effect, improving their reception characteristics.

In general, during parallel transmission, a same long code is used for a plurality of antennas and their transmission power is determined taking account of interference with other channels or other cells as follows: if transmission is performed with power of 1 through one antenna, then through two antennas transmission is performed with power of 0.5 each. At this time, the transmission characteristic of each antenna deteriorates by the degree transmission power is weakened, but a diversity effect produced when the receiving side combines a plurality of transmission signals improves reception characteristics in the long run.

However, in the cell search method above, if a same search code is transmitted from a plurality of antennas simultaneously, the number of matched filters will not increase on the receiving side but reception characteristics deteriorate due to independent fading variations. On the other hand, using different short codes (search codes) like control channels will cause problems such as code shortage or deterioration of reception characteristics due to an increase of the number of matched filters or increase of interference (mutual correlation between search codes) on the receiving side.

SUMMARY OF THE INVENTION

It is an objective of the present invention to provide a transmission apparatus and base station apparatus using it, capable of preventing deterioration of reception characteristics during a cell search on the receiving side due to fading variations or an increase of the number of matched filters and interference even when the transmitting side transmits control channel signals in parallel from a plurality of antennas.

A technology of transmitting signals in parallel from a plurality of antennas (parallel transmission) is being studied in radio communication systems. Suppose this parallel transmission includes all transmission systems simply carrying out parallel transmission from a plurality of antennas without depending on the transmitting order or timing of transmission signals or spreading codes. Recently, introducing an orthogonal transmission diversity system (OTD) using a plurality of antennas in CDMA radio communication systems is under study. This technology is intended to effectively improve reception characteristics through transmission diversity effects.

Thus, the present inventor, et al. came up with the present invention by taking notice of introducing a parallel transmission technology to cell searches in the CDMA cellular system and finding that its transmission diversity effect improves reception characteristics. This allows transmitted/received signals to become more resistant to fading variations (especially during slow movement) or shadowing, improving reception characteristics.

The present inventor, et al. also came up with the present invention by finding that applying the OTD technology to control channels, for example, perch channels, would improve reception characteristics through diversity effects. This makes it possible to extend the cell radius (coverd area) while using same transmission power and suppress interference with other channels due to a reduction of perch channel transmission power in the same area.

That is, the key point of the present invention is TSDT (Time-Switched Transmit Diversity) which means when carrying out diversity transmission, control channels (CCH) are transmitted in parallel through a plurality of antennas with search codes inserted and by switching those antennas according to the search codes.

More specifically, antennas transmitting search codes are switched so that a search code may be transmitted through only one antenna in a given instant. In this case, switching of antennas can be performed either periodically or randomly. In other words, it is only search codes that are transmitted using TSTD. When a plurality of search codes are multiplexed and transmitted, either they may always be multiplexed and sent from a same antenna or they may be transmitted from different antennas. Transmission using a same antenna is necessary when using one code to detect another data-modulated code.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below. (Embodiment 1)

Figure 1:
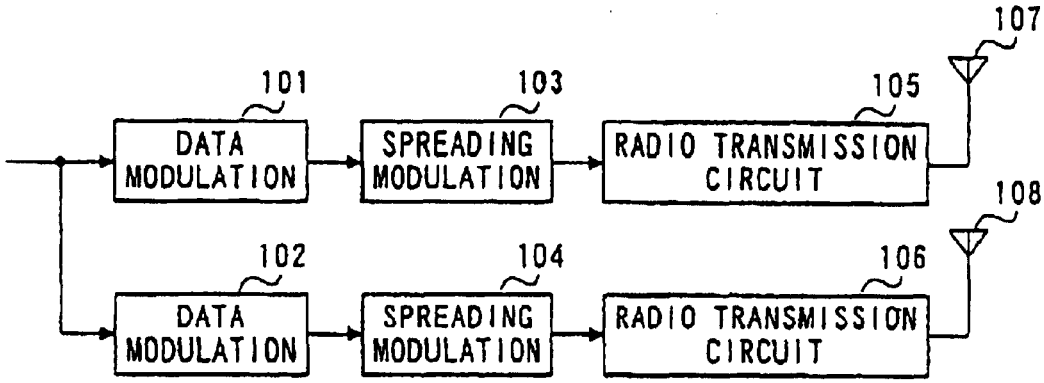
FIG. 1 is a block diagram showing the configuration of an apparatus carrying out parallel transmission in a base station apparatus according to Embodiment 1 of the present invention.

First, FIG. 1 is used to explain parallel transmission. FIG. 1 is a block diagram showing the configuration of an apparatus carrying out parallel transmission in a base station apparatus according to Embodiment 1 of the present invention. This apparatus modulates transmission data through a plurality (two in the figure) of data modulation sections 101, 102, spreads through spreading-modulation sections 103, 104, carries the data on carriers through radio transmission circuits 105,106 and transmits through antennas 107, 108.

Figure 2:
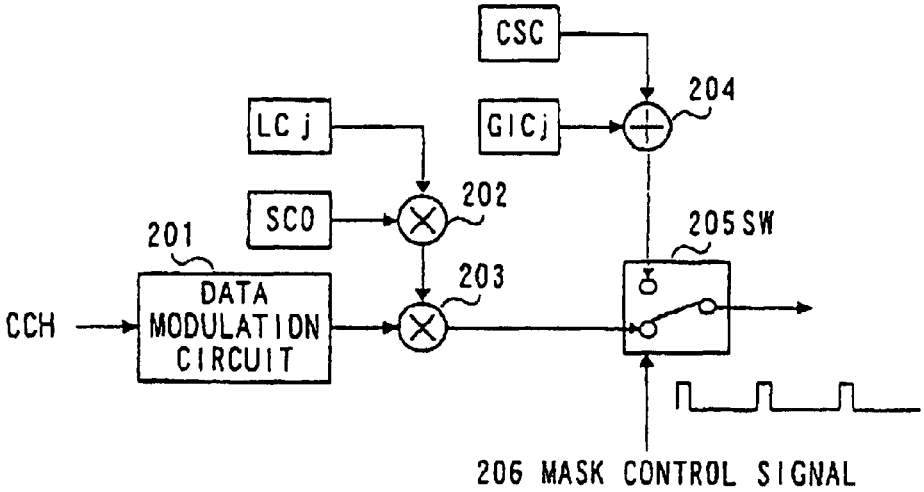
FIG. 2 is a block diagram showing the configuration of an apparatus creating long code masks of the base station apparatus according to the above embodiment.

Then, FIG. 2 is used to explain how a long code mask is created. FIG. 2 is a block diagram showing the configuration of an apparatus creating long code masks in the base station apparatus according to Embodiment 1 of the present invention. In this apparatus, a control channel signal is modulated by data modulation circuit 201, and these modulated data are multiplied in multiplier 203 by short code SC0 and long code LCj which were multiplied by multiplier 202 beforehand.

For the part to be masked in a control channel signal, short code CSC (first search code) and group identification code GICJ (second search code) are added up. These short code CSC and group identification code GICJ are added to the control channel signal as masks after they are appropriately switched by switch 205 according to mask control signal 206 having a pulse waveform shown in the figure.

Figure 3:
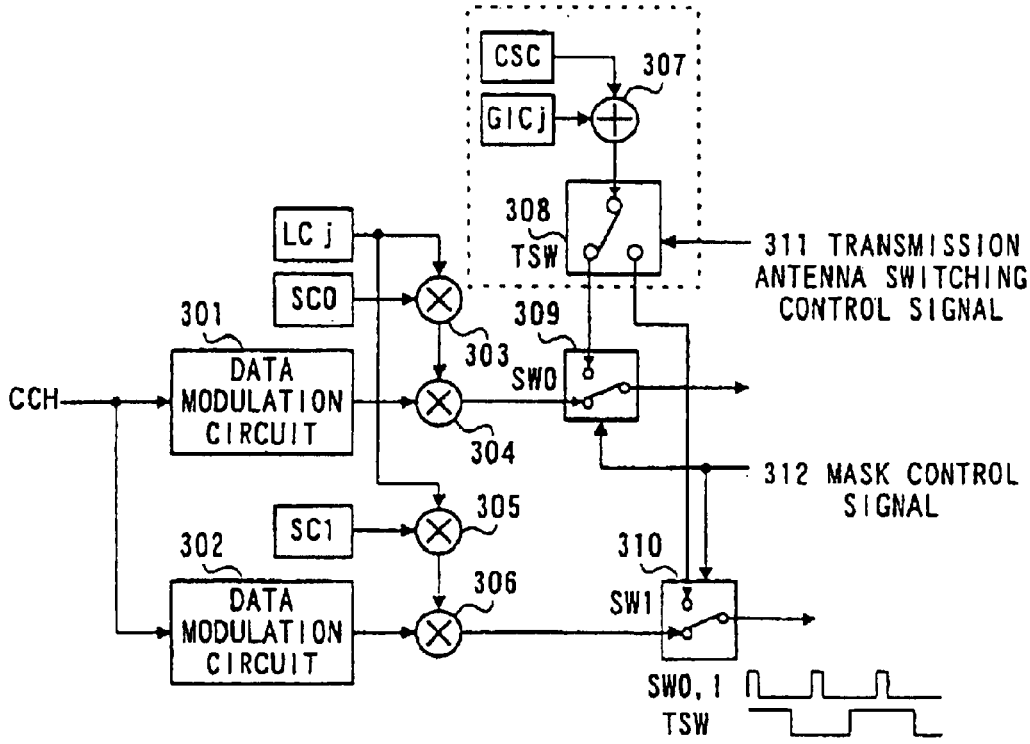
FIG. 3 is a block diagram showing the configuration of a transmission apparatus of the base station apparatus according to the above embodiment.

Then, the transmission apparatus of the present embodiment is explained using FIG. 3. FIG. 3 is a block diagram showing the configuration of the transmission apparatus of the base station apparatus according to the above embodiment.

This transmission apparatus enables parallel transmission using two systems and comprises data modulation circuits 301,302 that carry out data modulation, multipliers 304,306 that multiply the demodulated signals by specific codes, multipliers 303,305 that multiply long code LCj (scrambling code) and short codes SC0,SC1 respectively, a search code providing section that provides search codes, and a search code multiplexing section that multiplexes the search codes using switches 308,309,310 which are the sections for Switching the multiplexing destinations of search codes.

Figure 6:
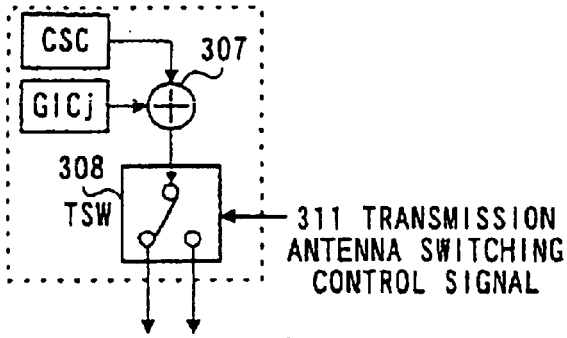
FIG. 6 is a schematic drawing showing the configuration of a search code multiplexing section of the transmission apparatus of Embodiments 1 and 2 above.

As shown in FIG. 6, the search code providing section comprises adder 307 that adds up short code CSC and group identification code CICj and the search code multiplexing section comprises switches 308,309,310 that multiplex the added codes over one control channel signal as a mask.

Then, the operation of the transmission apparatus configured as shown above is explained.

Control channel signals are each input to data modulation circuits 301,302 where they are subjected to data-modulation processing. In multipliers 303,305, long code LCj and short codes SC0, SC1 are multiplied. These multiplied long code LCj and short code SC0 are multiplied on the output of data modulation circuit 301 by multiplier 304 and long code LCj and short code SC1 are multiplied on the output of data modulation circuit 302 by multiplier 306.

In a base station apparatus provided with this transmission apparatus, for example, a long code LCj assigned differs from one base station to another. As described above, control channel signals are dually spread with long code LCj and short code SC. This allows each base station to use a common short code group.

On the other hand, in the search code providing section, short code CSC and group identification code GICj are added up by adder 307 and the multiplexing section multiplexes them over one control channel signal by switching of switch (TSW) 308. Switching of switch 308 is controlled by transmission antenna switching control signal 311.

Switch (SW0) 309 and switch (SW1) 310 turn ON at a prescribed timing and aforementioned short code CSC and group identification code GICj are multiplexed over a control channel signal at that timing.

Therefore, if switch TSW 308 turns ON at a timing of the waveform in FIG. 3, that is, it is selected as the multiplexing destination, switches SW0 and SW1 turn ON at a timing of the waveform in FIG. 3 and short code CSC and group identification code GICJ are multiplexed over the control channel signal. These switches SW0 and SW1 are controlled by mask control signal 312. That is, switches SW0,SW1 are controlled so that short code CSC and group identification code GICj may be multiplexed over one control channel signal at a specific timing.

Figure 8:
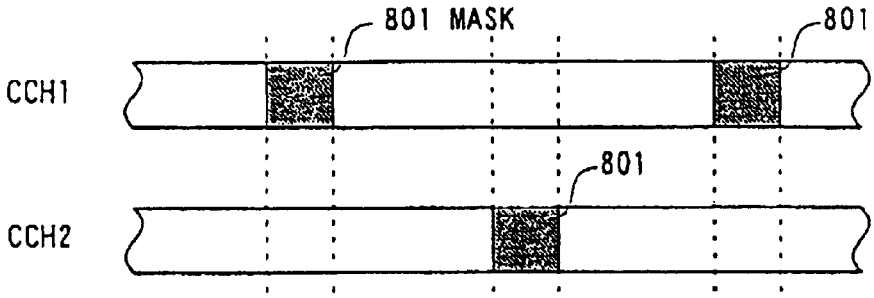
FIG. 8 is a schematic drawing showing the timing of multiplexing search codes with control channels in Embodiments 1 and 2 above.
Figure 9:
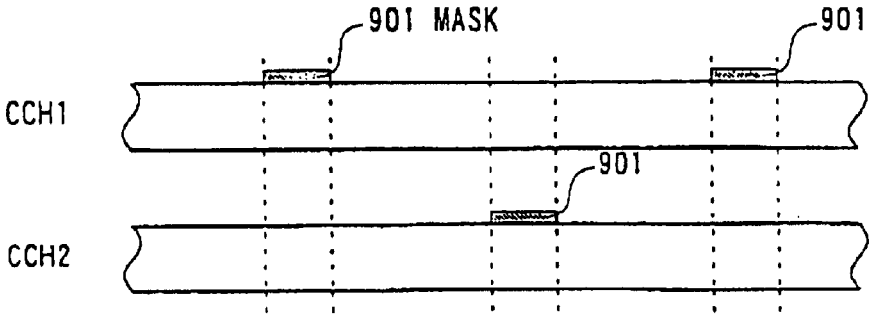
FIG. 9 is a schematic drawing showing the timing of multiplexing search codes with control channels in Embodiments 1 and 2 above.

Such control allows a search code to be multiplexed as masks 801,901 as shown in FIG. 8 and FIG. 9. FIG. 8 is a drawing showing a state in which a search code and control channel signal are time-multiplexed. In this case, the control channel signal and masks can use different or same short codes. FIG. 9 is a drawing showing a state in which a search code and control channel signal are code-multiplexed. In this case, the control channel signal and masks must use different short codes.

As shown in FIG. 8, if the search code and control channel signal are time-multiplexed, they are not overlapped on a same time zone, and therefore same short codes can be shared. If the search code and control channel signal are code-multiplexed, a new short code must be provided for the search code, but multiplexing and transmission power control of search codes can be performed independently of control channels.

*In accordance with the above description of FIGS. 3 and 8, multiplexing component 308, 309, 310 multiplexes a search code (CSC and $GIC_j$ added together at 307) with a first control channel signal, of said plurality of control channel signals, output from 304 and a second control channel signal, of said plurality of control channel signals, output from 306 at a specific timing as illustrated for example in FIGS. 8 and 9. Each of FIGS. 5 and 10 includes a similar multiplexing component, as described in detail below.*

The present embodiment explains a case as shown in FIG. 6 where the search code multiplexing section has a configuration in which the multiplexing destination of a search code is switched in such a way that a plurality of codes (two codes here) are multiplexed in synchronization with the control channel signal (configuration for transmitting search codes from a same antenna). With such a configuration, if one code is used as a known signal to estimate channels, it is possible to detect another code using the result of channel estimation even if that code has been subjected to data modulation and transmitted.

Figure 7:
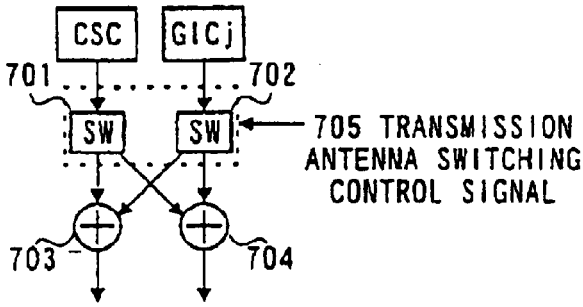
FIG. 7 is a schematic drawing showing the configuration of a search code multiplexing section of the transmission apparatus of Embodiments 1 and 2 above.

Furthermore, the search code multiplexing section can also have a configuration shown in FIG. 7, that is, a configuration in which the multiplexing destination of a search code is switched in such a way that a plurality of codes are multiplexed independently of the control channel signal (configuration for transmitting search codes from different antennas). That is, the search code multiplexing section can have a configuration comprising switch 701 for independently switching the multiplexing destination of short code CSC, switch 702 for independently switching the multiplexing destination of group identification code GICJ and adders 703,704 that add up short code CSC and group identification code GICj. These switches 701,702 are controlled by a transmission antenna switching control signal.

Such a configuration allows mask multiplexing to be performed at various timings, increasing variations in mask multiplexing. Furthermore, even if transmission power of search codes is strong compared to transmission power of control channels, this configuration can prevent a plurality of search codes from transmitting from a same antenna simultaneously, enabling the peak factor requested by a transmission amplifier to reduce.

The transmission apparatus of the present embodiment switches the transmission antenna of search cods so that search codes may be transmitted only through one antenna in a given instant. In this case, switching can be performed either periodically or randomly. That is, it is only search codes that are transmitted using TSTD. However, transmission power of search codes is controlled independently of control channels.

This allows transmission diversity effects to be demonstrated not only for control channels but also for search codes, making them more resistant to fading variations, especially fading variations and shadowing during slow movement and improving reception characteristics on the receiving side. Furthermore, the transmission apparatus of the present embodiment can reduce the number of correlators such as matched filters required for a cell search, making it possible to improve reception characteristics and simplify the configuration of the apparatus.

Since the transmission diversity system for control channels is different from that for search codes, with different effects obtained and different required reception characteristics, transmission power of search codes may be controlled independently of that of control channels. For example, even if control channels are transmitted with 50% power (0.5) through parallel transmission by two channels, search codes may be transmitted with the same power (1) as in the case of one search code.

(Embodiment 2)

The present embodiment explains a case where OTD (Orthogonal Transmit Diversity), a mode of parallel transmission, is used. OTD refers to a technology by which a transmission signal is converted from serial to parallel, data-modulated and spread-modulated, and each transmitted in parallel from different antennas while maintaining orthogonality.

Figure 4:
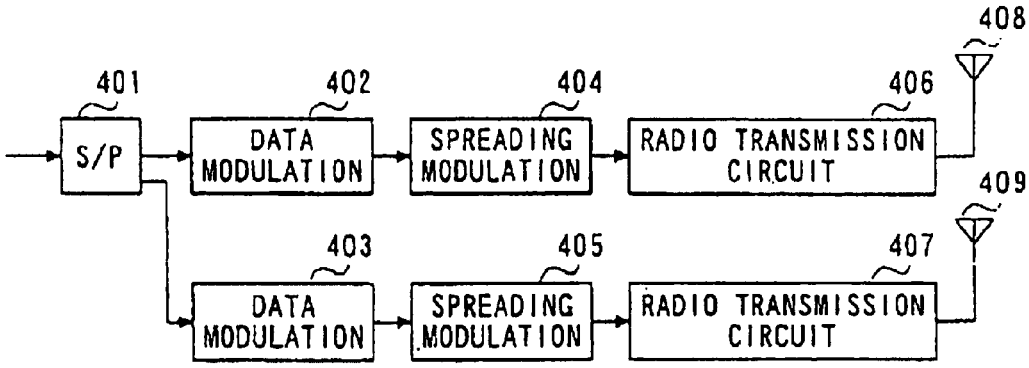
FIG. 4 is a block diagram showing the configuration of an apparatus carrying out orthogonal transmission diversity in a base station apparatus according to Embodiment 2 of the present invention.

FIG. 4 is a block diagram showing the configuration of an apparatus carrying out OTD in Embodiment 2 of the present invention. This apparatus converts transmission data to parallel through a plurality (two in the figure) of systems through serial/parallel conversion section 401, modulates the data through data modulation sections 402,403, spread-modulates through spread-modulation sections 404,405, carries the data on carriers through radio transmission circuits 406,407 and transmits through antennas 408,409.

Figure 5:
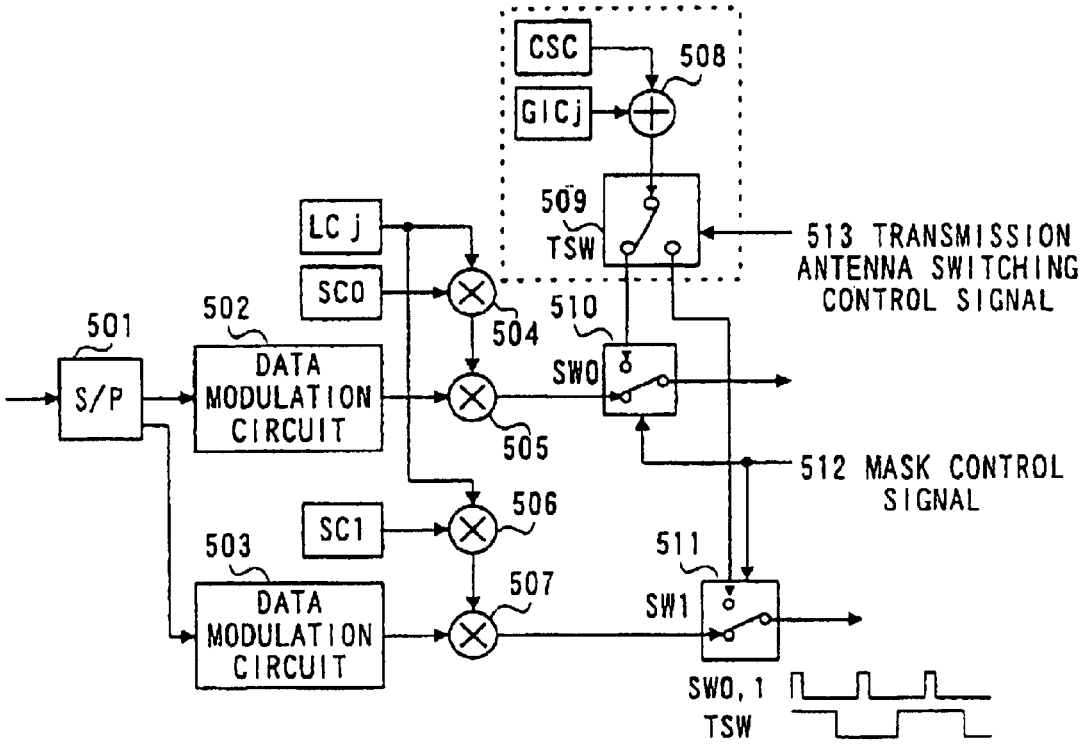
FIG. 5 is a block diagram showing the configuration of a transmission apparatus of the base station apparatus according to the above embodiment.

Then, a transmission apparatus of the present embodiment is explained using FIG. 5. FIG. 5 is a block diagram showing the configuration of the transmission apparatus in a base station apparatus according to Embodiment 2 of the present invention.

This transmission apparatus enables parallel transmission using two systems and comprises serial/parallel conversion section 501 that converts control channel signals from serial to parallel, data modulation circuits 502,503 that perform data modulation on a control channel (e.g., perch channel) signal, multipliers 505,507 that multiply the demodulated signal by a specific coda, multipliers 504,506 that multiply long code LCj and short codes SC0,SC1 respectively, a search code providing section that provides search codes, and a search code multiplexing section that multiplexes the search codes using switches 509,510,511 that are the switching sections to switch the multiplexing destination of search codes.

The search code providing section comprises adder 508 that adds up short code CSC and group identification code CICj and the search code multiplexing section comprises switches 509,510,511 that multiplex the added code over one control channel signal as a mask.

Then, the operation of the transmission apparatus configured as shown above is explained.

The control channel signal is converted from serial to parallel by serial/parallel conversion section 501, input to two data modulation circuits 502,503 and subjected to data modulation processing. In multipliers 504,506, long code LCj and short codes SC0,SC1 are multiplied. These multiplied long code LCj and short code SC0 are multiplied on the output of data modulation circuit 502 by multiplier 505 and long code LCj and short code SC1 are multiplied on the output of data modulation circuit 503 by multiplier 507.

In the base station apparatus with this transmission apparatus, for example, a long code LCj assigned differs from one base station to another. As described above, control channel signals are dually spread with long code LCj and short code SC. This allows each base station to use a common short code group.

On the other hand, in the search code providing section, short code CSC and group identification code GICj are added up by adder 508 and the multiplexing section multiplexes them over one control channel signal by switching of switch (TSW) 509. Switching of switch 509 is controlled by transmission antenna switching control signal 513.

Switch (SW0) 510 and switch (SW1) 511 turn ON at a prescribed timing and aforementioned short code CSC and group identification code GICj are multiplexed over the control channel signal at that timing.

Therefore, if switch TSW 509 turns ON at a timing of the waveform in FIG. 5, that is, it is selected as the multiplexing destination, switches SW0 and SW1 turn ON at a timing of the waveform in FIG. 5 and short code CSC and group identification code GICj are multiplexed over the control channel signal. These switches SW0 and SW1 are controlled by mask control signal 512. That is, switches SW0 and SW1 are controlled so that short code CSC and group identification code GICj may be multiplexed over any one control channel signal at a specific timing. Such control allows a search code to be multiplexed as masks 801,901 as shown in FIG. 8 and FIG. 9.

The present embodiment explains a case as shown in FIG. 5 where the search code multiplexing section has a configuration in which the multiplexing destination of a search code is switched in such a way that a plurality of codes (two codes here) are multiplexed in synchronization with the control channel signal. Furthermore, the search code multiplexing section can also have a configuration shown in FIG. 7, that is, a configuration in which the multiplexing destination of a search code is switched in such a way that a plurality of codes are multiplexed independently of the control channel signal. This configuration is explained in detail in Embodiment 3.

The transmission apparatus of the present embodiment switches the transmission antenna of search cods so that search codes may be transmitted only through one antenna in a given instant. In this case, switching can be performed either periodically or randomly. That is, it is only search codes that are transmitted using TSTD.

In this case, the amount of transmission data is reduced to a fraction of the original amount divided by the number of antennas, and therefore when transmitting using the same band, the spreading factor can be multiplied by the number of antennas. For example, in the case of x64 spreading with one antenna, the spreading factor becomes x128 with two antennas. The spreading codes used for spread-modulation are mutually orthogonal (called "orthogonal codes"). Therefore, even if transmission power of each antenna is reduced to a fraction of the amount divided by the number of antennas, spreading gain (process gain) by despreading is multiplied by the number of antennas, and therefore the basic characteristic of each antenna remains the same as that for one antenna.

Furthermore, according to the transmission apparatus of the present embodiment, signals converted from serial to parallel are each transmitted from different antennas through different paths, and therefore it is possible to reduce concentration errors during slow fading such as burst errors and deterioration by shadowing (slow variations of reception power due to tree and building shadows) compared to transmission using one antenna.

When the transmission apparatus of the present embodiment performs error correction encoding on transmission data, then converts them from serial to parallel and transmits from respective antennas, and the receiving side detects each transmitted signal, converts it from parallel to serial, then performs error correction decoding, it is especially effective because it allows a drastic improvement of reception characteristics.

The transmission apparatus of the present embodiment can further reduce the number of correlators such as matched filters required for a cell search on the receiving side, making it possible to improve reception characteristics and at the same time simplify the apparatus configuration.

Since the transmission diversity system for control channels is different from that for search codes, with different effects obtained and different required reception characteristics, transmission power of search codes may be controlled independently of that of control channels. For example, even if control channels are transmitted with 50% power (0.5) through two OTDs, search codes may be transmitted with the same power (1) as in the case of search codes.

(Embodiment 3)

The present embodiment explains a case where transmission diversity is carried out in such a way that short code (CSC) and short code (GICj) are not transmitted from a same antenna simultaneously.

In some CDMA radio communication systems, transmission power of search codes may be stronger than that of control channels. At this time, if switching is performed so that a plurality of search codes may be multiplexed in synchronization with one control channel, extremely high transmission peak power is required at the transmission timing of search codes. Meeting this requirement requires the use of an expensive power amplifier with a large dynamic range. It is therefore desirable to reduce the peak factor required for the transmission amplifier of the transmission apparatus.

Figure 10:
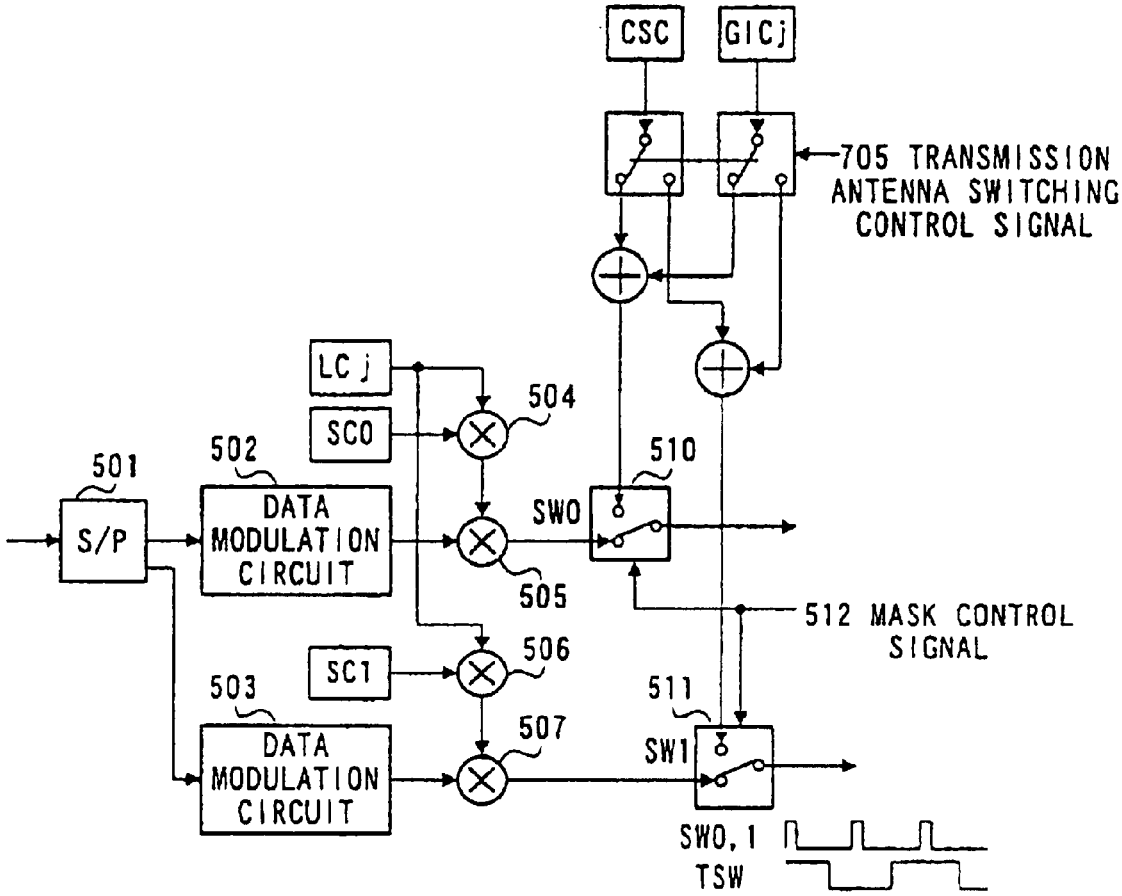
FIG. 10 is a block diagram showing the configuration of a transmission apparatus of a base station apparatus according to Embodiment 3 of the present invention.

The present embodiment explains a case where OTD, a mode of parallel transmission, is used. FIG. 10 is used to explain the transmission apparatus of the present embodiment. FIG. 10 is a block diagram showing the configuration of a transmission apparatus of a base station apparatus according to Embodiment 3 of the present invention. The transmission apparatus shown in FIG. 10 is a combination of the transmission apparatus in FIG. 5 and the switching section in FIG. 7.

That is, this transmission apparatus enables OTD transmission by two systems and comprises serial/parallel conversion section 501 that converts a control channel signal from serial to parallel, data modulation circuits 502,503 that perform data modulation on a control channel (e.g., perch channel) signal, multipliers 505,507 that multiply the modulated signal by a specific code, multipliers 504,506 that multiply long code LCj and short codes SC0,SC1 respectively, a CSC generator that generates short code CSC which is a search code, a GICj generator that generates group identification code GICj which is also a search code, switches 701, 702 that are the switching sections to switch the multiplexing destination of search codes, and switches (SW0) 510 and (SW1) 511 that switch between a spread-modulated signal and search code and time-multiplex them.

Then, the operation of the transmission apparatus configured as shown above is explained.

Control channel signals are converted from serial to parallel by serial/parallel conversion section 501, input to data modulation circuits 502,503 where they are subjected to data-modulation processing. In multipliers 504 and 506, long code LCj and short codes SC0,SC1 are multiplied. These multiplied long code LCj and short code SC0 are multiplied on the output of data modulation circuit 502 by multiplier 505 and long code LCj and short code SC1 are multiplied on the output of data modulation circuit 503 by multiplier 507.

In the base station apparatus provided with this transmission apparatus, for example, a long code LCj assigned differs from one base station to another. As described above, control channel signals are dually spread with long code LCj and short code SC. This allows each base station to use a common short code group.

On the other hand, short code CSC and group identification code GICJ are switched at a specific timing by interlocked switches (TSW) 701,702 and transmitted from different antennas. Therefore, the multiplexing destinations are controlled in such a way that search codes sent from those antennas are always switched.

Switch (SW0) 510 and switch (SW1) 511 turn ON at a prescribed timing and aforementioned short code CSC and group identification code GICj are multiplexed over the control channel signal at the same timing.

Therefore, if switches (TSW) 701,702 turn ON at a timing of the waveform in FIG. 10, that is, if SW0 for CSC and SW1 for CICj are selected respectively as the multiplexing destinations, switches SW0 and SW1 turn ON at a timing of the waveform in FIG. 10 and short code CSC and group identification code GICj are multiplexed over the control channel signal.

These switches SW 701,702 are controlled by transmission antenna switching control signal 705 and switches SW0 and SW1 are controlled by mask control signal 512. That is, switches SW0,SW1 are controlled so that short code CSC and group identification code GICj may be multiplexed over any one control channel signal at a specific timing, and switches SW 701,702 are controlled so that search codes to be multiplexed over each control channel may be switched every time.

Figure 11:
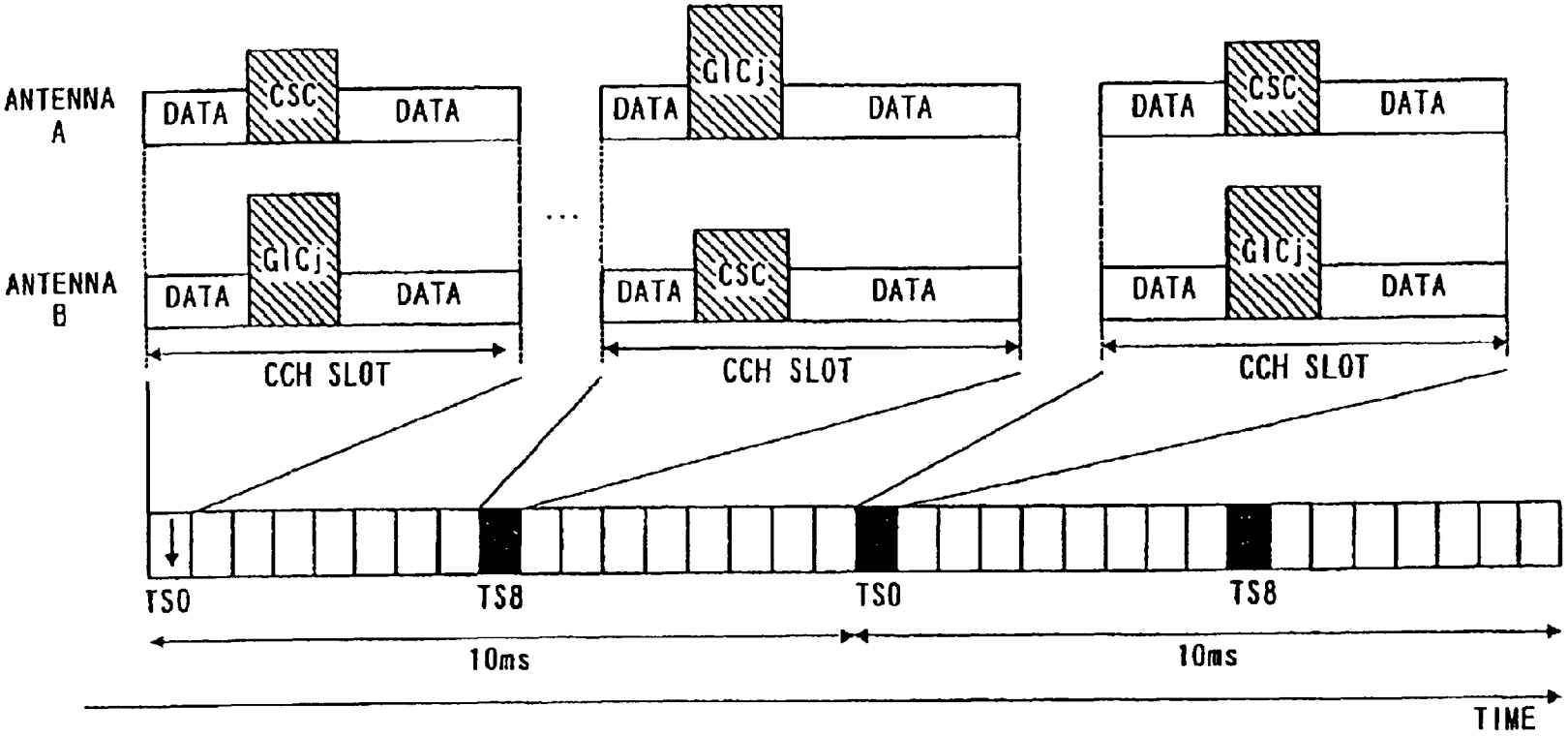
FIG. 11 is a drawing to explain the timing of multiplexing search codes with control channels in Embodiment 3 above.

An example of the multiplexed signal during the aforementioned operation is shown in FIG. 11. In FIG. 11, suppose control channels are transmitted with No. 0 (TS0) and No. 8 (TS8) as CCH slots in a 10 ms frame consisting of 16 slots. In these TS0 and TS8, CSC and CICj are transmitted from different antennas, antenna A and antenna B, and CSC and CISj are transmitted by changing their transmission antennas from A to B to A and from B to A to B, respectively.

According to the transmission apparatus of the present embodiment, each search code is transmitted from a different antenna at every transmission timing, making it possible to obtain transmission diversity effects. Furthermore, when transmission power of search codes is stronger than that of control channels, the present embodiment can prevent a plurality of search codes from being transmitted from a same antenna simultaneously, reducing the peak factor required by a transmission amplifier.

When transmitting short code CSC and short code GICj from different antennas, the channel for transmitting search codes and the control channel may be different. This status is shown in FIG. 12 and FIG. 13.

Figure 12:
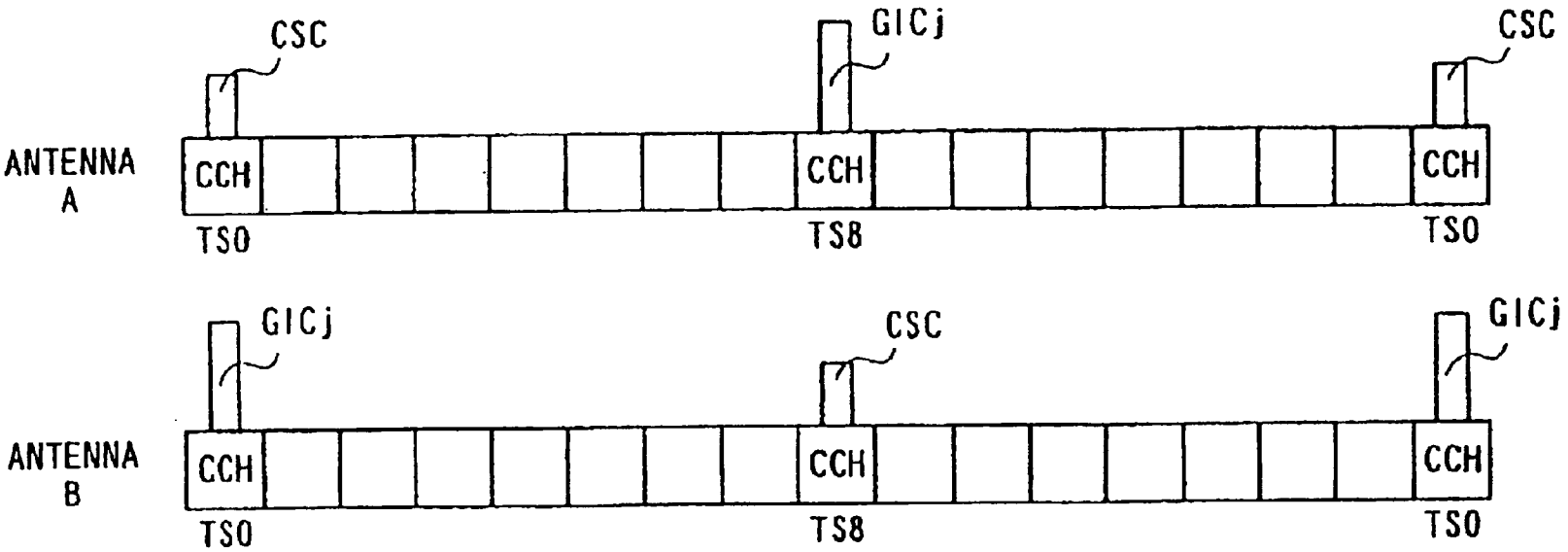
FIG. 12 is a drawing to explain the multiplexing timing when control channels and search code channels are code-multiplexed in Embodiment 3 above.
Figure 13:
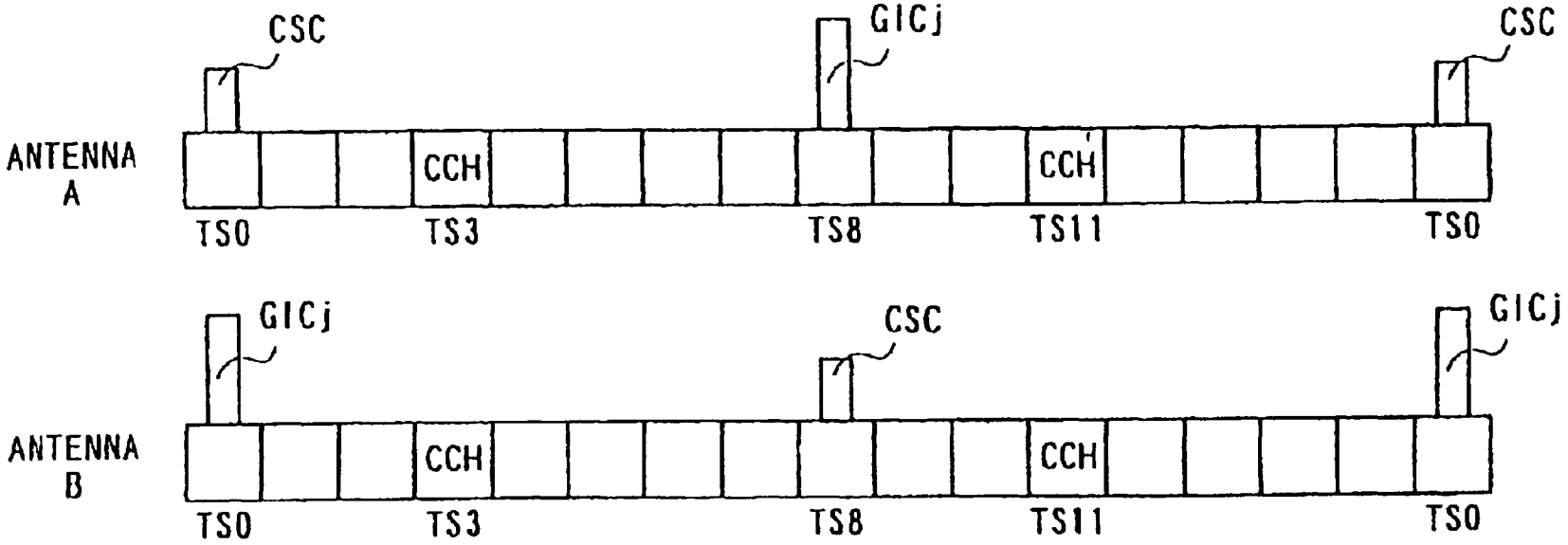
FIG. 13 is a drawing to explain the multiplexing timing when control channels and search code channels are code-multiplexed in Embodiment 3 above.

In the case shown in FIG. 12, in antenna A, short code CSC and the control channel signal are code-multiplexed and transmitted at TS0 and short code GICj and the control channel signal are code-multiplexed and transmitted at TS8.

On the other hand, in antenna B, short code GICJ and the control channel signal are code-multiplexed and transmitted at TS0 and short code CSC and the control channel signal are code-multiplexed and transmitted at TS8.

In such a code-multiplexing transmission mode, each search code is transmitted from a different antenna at every transmission timing, making it possible to obtain transmission diversity effects. Furthermore, when transmission power of search codes is stronger than that of control channels, the present embodiment can prevent a plurality of search codes from being transmitted from a same antenna simultaneously, reducing the peak factor required by a transmission amplifier.

In the case shown in FIG. 13, the transmission mode is code-multiplexing, but search codes CSC and GICj are not multiplexed with the control channel signal and transmitted. That is, short codes CSC and GICj are transmitted from antennas A and B alternately at TS0 and TS8, while the control channel signal is transmitted at TS3 and TS11. Thus, the present embodiment is also applicable in a system using the dynamic channel assignment system that enhances the degree of freedom of the channel position.

As shown above, when a variable transmission timing is used for control channel signals to enhance the degree of freedom of slot assignment, each search code is transmitted from a different antenna at every transmission timing, making it possible to obtain transmission diversity effects. Furthermore, when transmission power of search codes is stronger than that of control channels, the present embodiment can prevent a plurality of search codes from being transmitted from a same antenna simultaneously, reducing the peak factor required by a transmission amplifier.

The present invention is not limited to Embodiments 1 to 3 above, but can be modified and implemented in various manners.

Embodiments 1 to 3 above explain the cases where different short codes are used for long codes, short code SC and group identification code GIC to be multiplied and short code CSC to be added, but the present invention can also be implemented by using same short codes for long codes, short code SC and group identification code GIC to be multiplied and short code CSC to be added.

As explained above, the transmission apparatus in the present invention makes control channels more resistant to fading variations (especially during slow movement) and shadowing through transmission diversity effects by parallel transmission including OTD, improving reception characteristics. It also allows switching transmission diversity effects to be demonstrated on search codes, making them more resistant to fading variations, especially fading during slow movement and shadowing, improving reception characteristics on the receiving side.

The transmission apparatus in the present invention can further obtain diversity effects without increasing the number of codes required for search codes per sector nor the receiving side increasing the number of matched filters required for search codes. This makes it possible to improve search code reception characteristics and improve initial synchronization characteristics.

The present invention is not limited to the above described embodiments, and various variations and modifications may be possible without departing from the scope of the present invention.

This application is based on the Japanese Patent Application No. HEI10-157405 filed on Jun. 5, 1998 and the Japanese Patent Application No. HEI11-051059 filed on Feb. 26, 1999, entire content of which is expressly incorporated by reference herein.

What is claimed is:

[1. A transmission apparatus comprising:

a search code provider that provides a search code to be used for cell search;

a plurality of transmission sections that transmit a plurality of control channel signals in parallel; and a multiplexer that multiplexes said search code with a first control channel signal of said plurality of control channel signals at a specific timing, wherein said multiplexer switches from multiplexing said search code with said first control channel signal to multiplexing said search code with another control channel signal of said plurality of control channel signals over time.]

[2. The transmission apparatus according to claim 1, wherein said multiplexer multiplexes the search code alternately with the plurality of control channel signals.]

[3. The transmission apparatus according to claim 1, wherein said transmission apparatus uses an orthogonal transmission diversity technique.]

[4. The transmission apparatus according to claim 1, wherein said multiplexer time-multiplexes the search code with the plurality of control channel signals.]

[5. The transmission apparatus according to claim 1, wherein said multiplexer code-multiplexes the search code with the plurality of control channel signals.]

[6. The transmission apparatus according to claim 1, wherein said search code provider provides a plurality of codes as the search code, and said multiplexer multiplexes separately the plurality of codes with the plurality of control channel signals.]

[7. The transmission apparatus according to claim 1, wherein said search code provider provides a plurality of codes as the search code, and said multiplexer multiplexes in synchronization the plurality of codes with the plurality of control channel signals.]

[8. A base station apparatus comprising a transmission apparatus comprising:

a search code provider that provides a search code to be used for cell search;

a plurality of transmission sections that transmit a plurality of control channel signals in parallel; and a multiplexer that multiplexes said search code with a first control channel signal of said plurality of control channel signals at a specific timing, wherein said multiplexer switches from multiplexing said search code with said first control channel signal to multiplexing said search code with another control channel signal of said plurality of control channel signals over time.]

[9. A transmission method used in a CDMA radio communication system, comprising:

(a) providing a search code to be used for cell search;

(b) transmitting a plurality of control channel signals in parallel; and c) multiplexing said search code with a first control channel signal of said plurality of control channel signals at a specific timing, and switching from multiplexing said search code with said first control channel signal to multiplexing said search code with another control channel signal of said plurality of control channel signals over time.]

[10. The transmission apparatus according to claim 1, wherein said multiplexer multiplexes the search code with said another control channel signal at a specific timing which is different from said specific timing that said multiplexer multiplexes said search code with said first control channel signal.]

[11. The transmission apparatus according to claim 8, wherein said multiplexer multiplexes the search code with said another control channel signal at a specific timing which is different from said specific timing that said multiplexer multiplexes said search code with said first control channel signal.]

[12. The transmission apparatus according to claim 9, wherein said multiplexer multiplexes the search code with said another control channel signal at a specific timing which is different from said specific timing that said multiplexer multiplexes said search code with said first control channel signal.]

*13. A transmission apparatus comprising:*

*a search code provider that provides a search code to be used for cell search;*

*a plurality of transmission sections that transmit a plurality of control channel signals in parallel; and*

*a multiplexing component that multiplexes said search code with a first control channel signal and a second control channel signal of said plurality of control channel signals at a specific timing,*

*wherein said first control channel signal and said second control channel signal are alternatively transmitted over time.*

*14. The transmission apparatus according to claim 13, wherein said transmission apparatus uses an orthogonal transmission diversity technique.*

*15. The transmission, apparatus according to claim 13, wherein said multiplexer time multiplexes the search code with the plurality of control channel signals.*

*16. The transmission apparatus according to claim 13, wherein said multiplexer code multiplexes the search code with the plurality of control channel signals.*

*17. The transmission apparatus according to claim 13, wherein said search code provider provides a plurality of codes as the search code, and said multiplexer multiplexes separately the plurality of codes with the plurality of control channel signals.*

*18. The transmission apparatus according to claim 13, wherein said search code provider provides a plurality of codes as the search code, and said multiplexer multiplexes in synchronization the plurality of codes with the plurality of control channel signals.*

*19. A base station apparatus comprising a transmission apparatus comprising: a search code provider that provides a search code to be used for cell search;*

*a plurality of transmission sections that transmit a plurality of control channel signals in parallel; and*

*a multiplexing component that multiplexes said search code with a first control channel signal and a second control channel signal of said plurality of control channel signals at a specific timing,*

*wherein said first control channel signal and said second control channel signal are alternatively transmitted over time.*

*20. The transmission apparatus according to claim 13, wherein said multiplexer multiplexes the search code with said another control channel signal at a specific timing which is different from said specific timing that said multiplexer multiplexes said search code with said first control channel signal.*

*21. A transmission method used in a spread spectrum radio communication system, comprising:*

*(a) providing a code to be used for cell search;*

*(b) transmitting a first parallel signal, wherein the first parallel signal corresponds to a first control channel signal multiplexed with the code; and*

*(c) transmitting a second parallel signal, wherein the second parallel signal corresponds to a second control channel signal multiplexed with the code;*

*wherein the first and second parallel signals are transmitted utilizing time switched transmit diversity.*

*22. The transmission apparatus according to claim 21, wherein said multiplexer multiplexes the search code with said another control channel signal at a specific timing which is different from said specific timing that said multiplexer multiplexes said search code with said first control channel signal.*

*23. A transmission method used in a spread spectrum radio communication system, comprising:*

(*a*) *providing a code to be used for cell search;*

(*b*) *periodically transmitting a first signal through a first antenna, wherein the first parallel signal corresponds to a first control channel signal multiplexed with the code; and*

(*c*) *alternatively transmitting a second signal through a second antenna over time, wherein the second parallel signal corresponds to a second control channel signal multiplexed with the code.*

*24. An apparatus comprising:*

*a reception device for obtaining a parallel signal from a base station apparatus, wherein the base station apparatus comprises:*

(*a*) *a search code provider that provides a search code to be used for cell search;*

(*b*) *a plurality of transmission sections that transmit a plurality of control channel signals in parallel; and*

(*c*) *a multiplexing component that multiplexes said search code with a first control channel signal and a second control channel signal of said plurality of control channel signals at a specific timing,*

*wherein said first control channel signal and said second control channel signal are alternatively transmitted over time.*

* * * * *